(12) United States Patent
Miyazaki

(10) Patent No.: US 8,834,143 B2
(45) Date of Patent: Sep. 16, 2014

(54) TIRE VULCANIZATION MOLD

(75) Inventor: Yusaku Miyazaki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 340 days.

(21) Appl. No.: 13/401,422

(22) Filed: Feb. 21, 2012

(65) Prior Publication Data

US 2012/0219650 A1 Aug. 30, 2012

(30) Foreign Application Priority Data

Feb. 24, 2011 (JP) ................................. 2011-037793
Feb. 25, 2011 (JP) ................................. 2011-039887

(51) Int. Cl.
*B29C 33/10* (2006.01)
*B29D 30/06* (2006.01)

(52) U.S. Cl.
CPC .......... *B29C 33/10* (2013.01); *B29D 2030/0617* (2013.01); *B29D 30/0606* (2013.01); *Y10S 425/812* (2013.01)
USPC .............................. 425/28.1; 425/46; 425/812

(58) Field of Classification Search
CPC ........................ B29D 2030/0617; B29C 33/10
USPC ..................... 425/28.1, 35, 46, 812
See application file for complete search history.

(56) References Cited

U.S. PATENT DOCUMENTS

| 2,756,460 | A | * | 7/1956 | Heintz, Jr. ..................... 425/28.1 |
| 3,377,662 | A | * | 4/1968 | Fukushima ................... 425/28.1 |
| 3,553,790 | A | * | 1/1971 | Brobeck et al. ............... 425/812 |
| 4,553,918 | A | * | 11/1985 | Yoda et al. ....................... 425/46 |
| 7,524,175 | B2 | * | 4/2009 | Henrotte et al. ................ 425/46 |
| 7,874,821 | B2 | * | 1/2011 | Ohara ........................... 425/28.1 |

FOREIGN PATENT DOCUMENTS

| DE | 1965121 | * | 7/1971 |
| JP | 2005-193577 | * | 7/2005 |
| JP | 2007-38426 A | | 2/2007 |
| JP | 2009-269363 A | | 11/2009 |

* cited by examiner

*Primary Examiner* — James Mackey
(74) *Attorney, Agent, or Firm* — Global IP Counselors, LLP

(57) ABSTRACT

A tire vulcanization mold can be configured to provide stable ventilation. For example, a tire molding surface has a ventilation groove having a rectangular shape in plan view. A blade has upper end, contact and communication sections. The upper end section thickness is smaller than a groove thickness. The contact section below the upper end section contacts both thickness-direction-facing side faces of the groove. The communication section communicates between a ventilation hole, and a small gap is formed between the groove and the upper end section. Alternatively, the blade has a groove section formed in at least one side face that faces in a blade thickness direction and extends between upper and lower blade ends to form a small gap between the groove and groove section. Air and gas pass through the gap and the communication section and vent to an exterior of the mold through the ventilation hole.

19 Claims, 19 Drawing Sheets

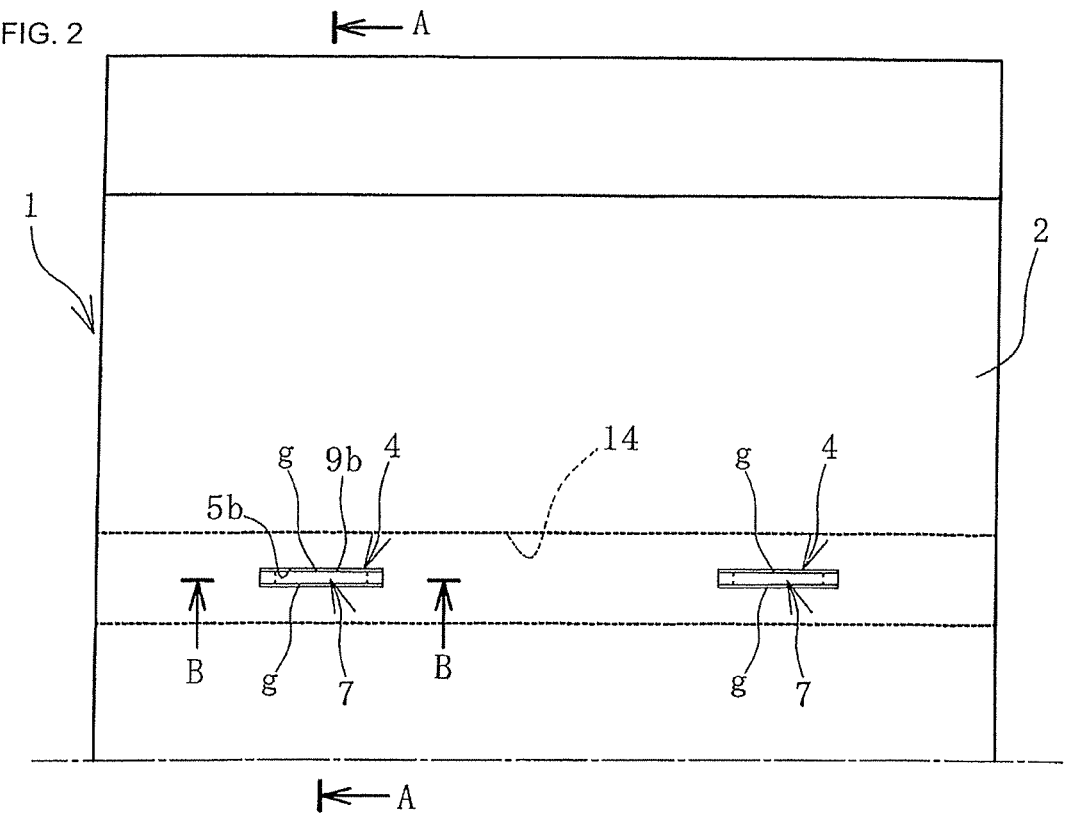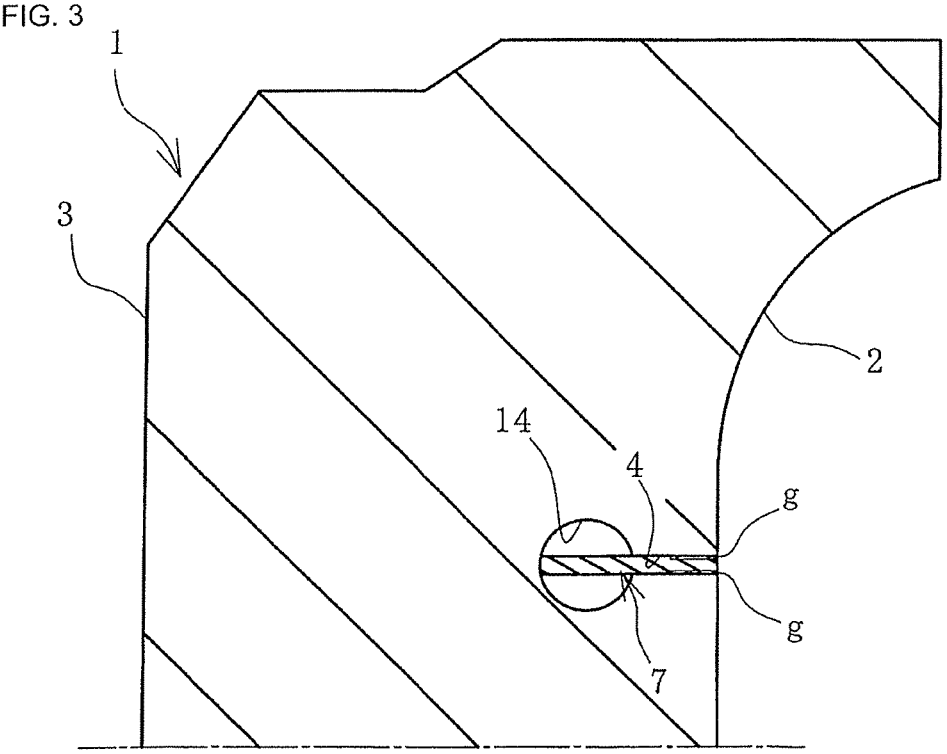

FIG. 8
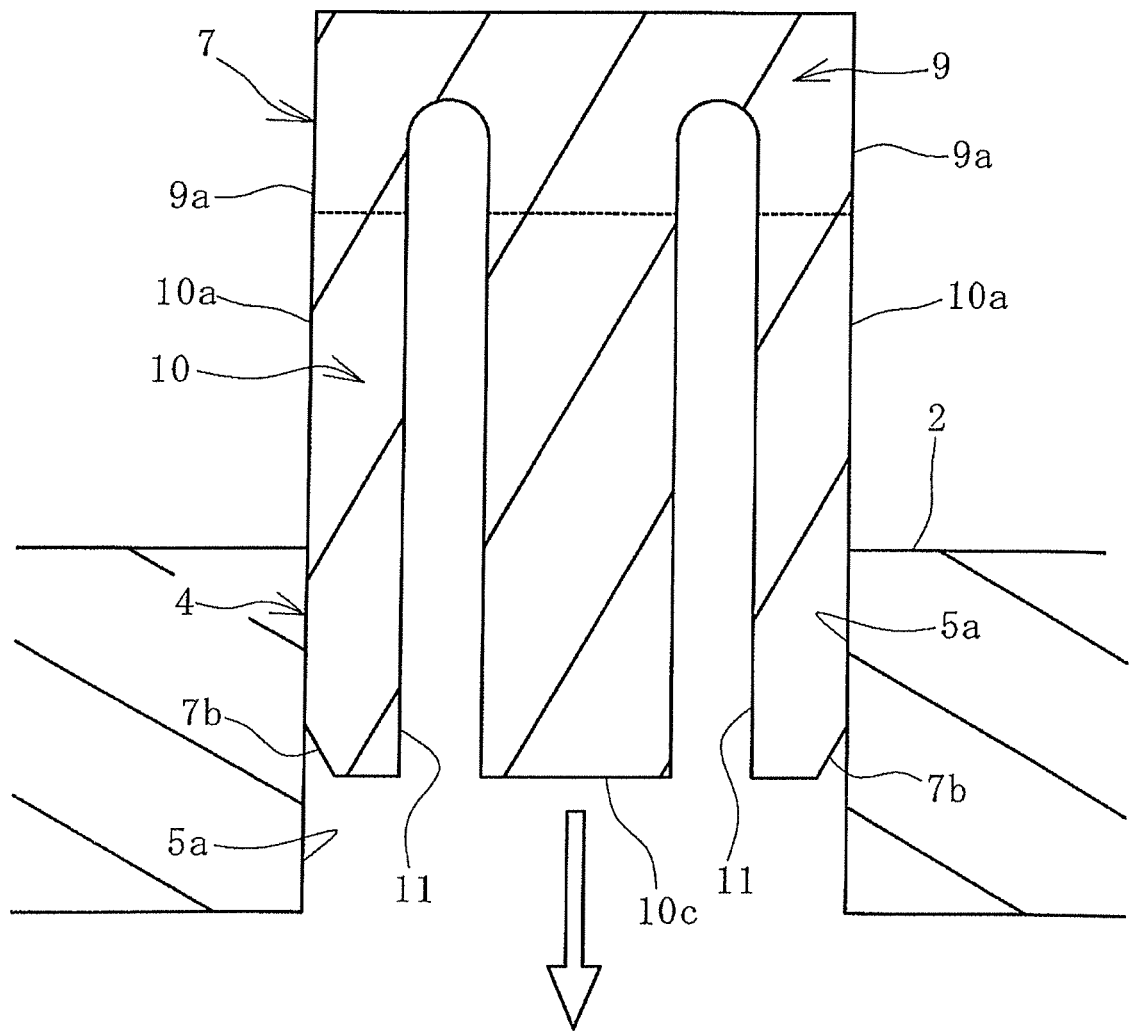
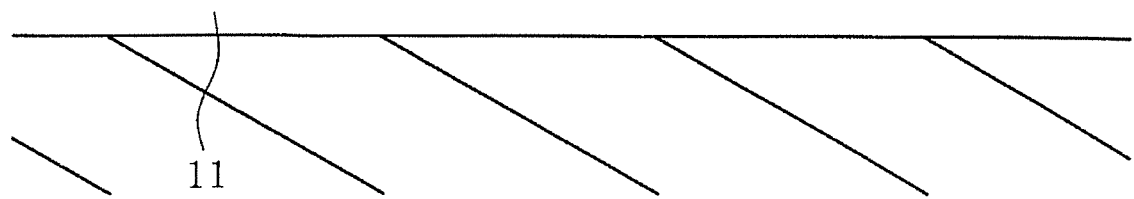

TIRE VULCANIZATION MOLD

CROSS-REFERENCE TO RELATED APPLICATIONS

This application claims priority to Japanese Patent Application No. 2011-037793, filed on Feb. 24, 2011, and Japanese Patent Application No. 2011-039887, filed on Feb. 25, 2011, the entire disclosures of Japanese Patent Application No. 2011-037793 and Japanese Patent Application No. 2011-039887 are hereby incorporated herein by reference.

BACKGROUND

1. Field of the Invention

The present invention relates to a tire vulcanization mold. More particularly, the present invention relates to a tire vulcanization mold that can simplify a machining process associated with forming a venting mechanism and ensure stable ventilation.

2. Background Information

When a tire is vulcanized, unnecessary air can become trapped inside a tire vulcanization mold and gas can be generated by the vulcanization. This air and gas can cause vulcanization failures such as insufficient rubber filling with respect to the tire being vulcanized. Therefore, a venting mechanism is provided in the tire vulcanization mold to vent air and gas generated during vulcanization to an exterior.

An exhaust mechanism is described in Laid-open Japanese Patent Publication No. 2007-38426 (JP2007-38426A) in which a mold is cast by pouring molten metal into a die into which a blade has been inserted such that a small gap is formed between the blade and the mold main body. The small gap forms a portion of a ventilation passage. However, since the small gap is formed by utilizing a difference between the thermal expansion coefficients (thermal contraction) of the blade and the mold main body, the size of the gap tends to vary and presents a disadvantage with respect to obtaining a stable ventilation efficiency.

Another structure for an exhaust mechanism is described in Laid-open Japanese Patent Publication No. 2009-269363 (JP2007-269363A) in which a narrow hole is provided in a tire molding surface and a blade is embedded in the narrow hole so as form a small gap between the blade and a long side of the narrow hole. Air and gas are vented to an exterior of the mold through this small gap. However, both lengthwise end portions of the narrow hole are made to be narrower in width than a middle portion in order to hold both end portions of the blade. More specifically, since the shape of the narrow hole provided in the tire molding surface is irregular and not simple in a plan view, the number of machining steps increases and the machining becomes complex. Also, if the irregularly shaped narrow hole is not machined precisely, then stable ventilation cannot be ensured.

SUMMARY

An object of the present invention is to provide a tire vulcanization mold that can simplify machining associated with forming a venting mechanism and ensure stable ventilation.

In order to achieve the aforementioned object, a tire vulcanization mold according to a disclosed embodiment comprises a ventilation groove formed in a tire molding surface such that it opens at the tire molding surface, a blade press fitted and embedded in the ventilation groove such that a small gap exists between the ventilation groove and the blade, and a ventilation hole that communicates between the ventilation groove and an exterior of the mold. The ventilation groove is rectangular in a plan view. The blade has an upper end section, a contact section, and a communication section. The upper end section has a thickness smaller than a thickness of the ventilation groove. The contact section is below the upper end section and configured to contact both thickness-direction-facing side faces of the ventilation groove when the blade is embedded in the ventilation groove. The communication section communicates between the ventilation hole and a small gap formed between the ventilation groove and the upper end section.

Another tire vulcanization mold according to another disclosed embodiment comprises a ventilation groove formed in a tire molding surfaces such that it opens at the tire molding surface, a blade press fitted and embedded in the ventilation groove such that a small gap exists between the ventilation groove and the blade, and a ventilation hole that communicates between the ventilation groove and an exterior of the mold. The ventilation groove is rectangular in a plan view. The blade has a groove section formed in at least one side face that faces in a thickness direction of the blade. The groove section extends from an upper end to a lower end of the blade. When the blade is embedded in the ventilation groove, a small gap exists between the ventilation groove and the groove section.

With the former tire vulcanization mold according to the disclosed embodiments, machining associated with forming a ventilation groove in the tire molding surface such that it opens at the tire molding surface is simplified because the ventilation groove is rectangular in a plan view. Also, the blade has an upper end section, a contact section, and a communication section. The upper end section has a thickness smaller than a thickness of the ventilation groove. The contact section is below the upper end section and configured to contact both side faces of the ventilation groove when the blade is press fitted into the ventilation groove. The communication section communicates between the ventilation hole and a small gap formed between the ventilation groove and the upper end section. As a result, when the blade is fitted into the ventilation groove, the blade can be held by the contact section while securing a small gap between the blade and the ventilation groove across the entire length of the upper end section of the blade. Moreover, when a green tire is vulcanized, unnecessary air and gas can pass through the gap and the communication section and be vented to the exterior of the mold through the ventilation hole formed in the mold. By utilizing the ventilation groove formed in the tire molding surface such that it opens at the tire molding surface in an effective manner and making a surface area of the small gap as large as possible, efficient and stable ventilation can be ensured.

With the latter tire vulcanization mold, a ventilation groove is formed to be open at a tire molding surface and be rectangular in a plan view. A blade is press fitted and embedded in the ventilation groove, and the blade has a groove section formed in at least one side face that faces in a thickness direction of the blade. The groove section extends from an upper end to a lower end of the blade. As a result, machining associated with forming the blade and the ventilation groove is simplified. Since the shapes of the blade and the ventilation groove are simple, they can easily be machined to the designed shapes. Thus, since the small gap between the ventilation groove and the groove section can be formed according to design when the blade is embedded in the ventilation groove, stable ventilation can be ensured through the small gap and the ventilation hole.

BRIEF DESCRIPTION OF THE DRAWINGS

Referring now to the attached drawings which form a part of this original disclosure:

FIG. 2 is a plan view showing an example of a portion of a tire molding surface of the tire vulcanization mold shown in FIG. 1;

FIG. 3 is a cross sectional view taken along section line A-A of FIG. 2;

FIG. 8 is a cross sectional side-face view showing an example of a blade being press fitted into a ventilation groove;

DETAILED DESCRIPTION OF EMBODIMENTS

Selected embodiments of a tire vulcanization mold will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
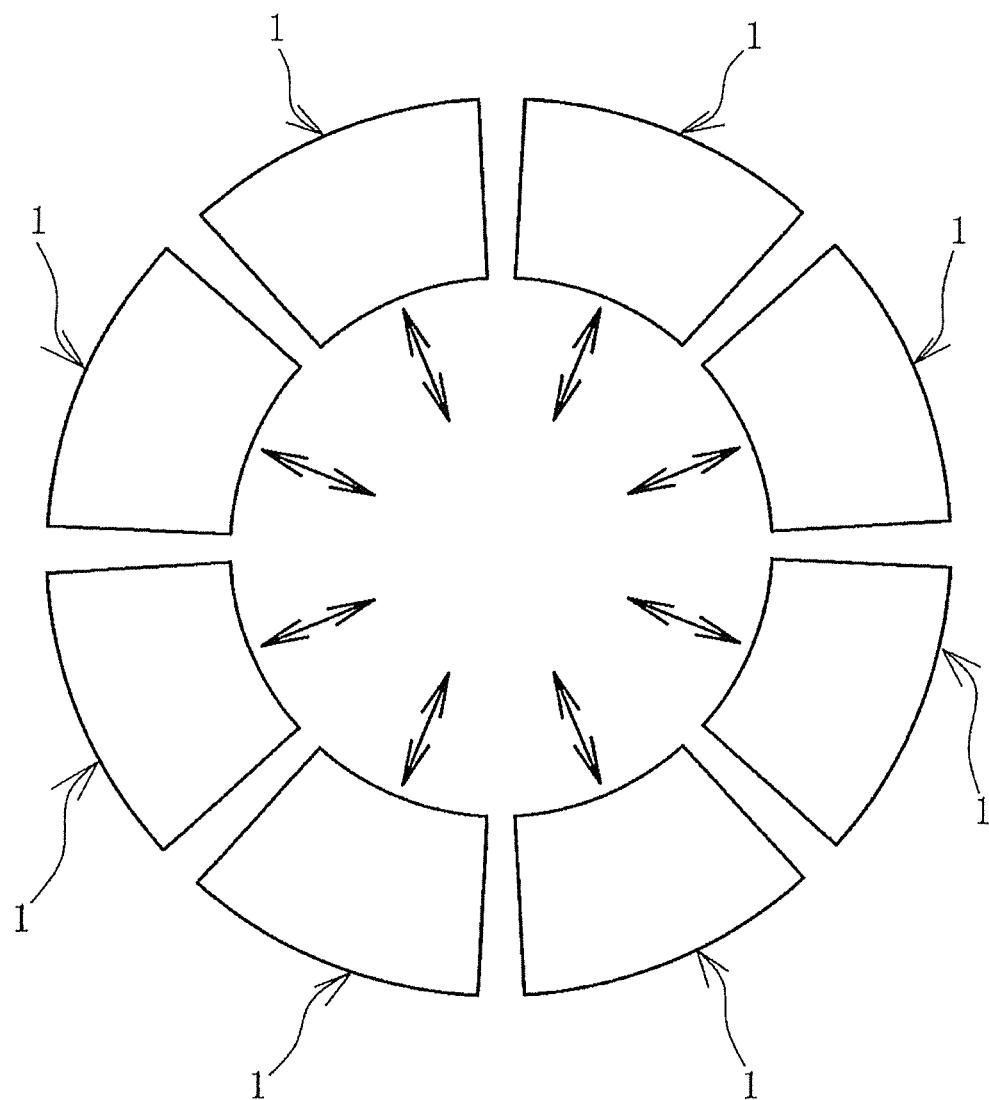
FIG. 1 is a plan view of showing an example of a tire vulcanization mold according to a disclosed embodiment.

FIG. 1 shows a plurality of tire vulcanization molds 1 (hereinafter called "mold 1") according to a disclosed embodiment. Each of the molds 1 in this example is a circular arc-shaped body and the molds 1 are attached together in an annular shape to form a sectional type mold. Each of the circular-arc shaped molds 1 toward and away from a center of the annular shape.

As shown in FIGS. 2 to 7, the molds 1 are made of aluminum or other material and have a tire molding surface 2 formed on an inner circumferential surface of the body 3 of the mold 1. A plurality of ventilation grooves 4 are formed in the tire molding surface 2 such that they open at the tire molding surface. A blade 7 is press fitted and embedded in each of the ventilation grooves 4. The tire molding surface 2 and an upper end surface of the blade 7 are at substantially the same level.

A ventilation hole 14 is formed in each of the molds 1 such that it extends from one end face to another end face. The ventilation hole 14 connects to the ventilation grooves 4 and allows the ventilation grooves 4 to communicate with an exterior of the mold 1. The ventilation grooves 4 are arranged such that their lengthwise directions are aligned with a direction in which the ventilation hole 14 extends.

Each of the ventilation grooves 4 has a prescribed uniform thickness T and is rectangular in a plan view. Each of the ventilation grooves 4 is cut with the uniform thickness T to a depth H2 in a depth direction.

Each of the blades 7 is a thin plate made of stainless steel or other metal and has a shape approximately corresponding to the shape of the ventilation groove 4 in a side view. A thickness t1 of an upper end section 9 of the blade 7 is smaller than the thickness T of the ventilation groove 4. The thickness t1 is, for example, approximately 0.005 to 0.1 mm smaller and preferably approximately 0.06 mm smaller (approximately 0.03 mm on one side) than the thickness T of the ventilation groove 4.

Figure 4:
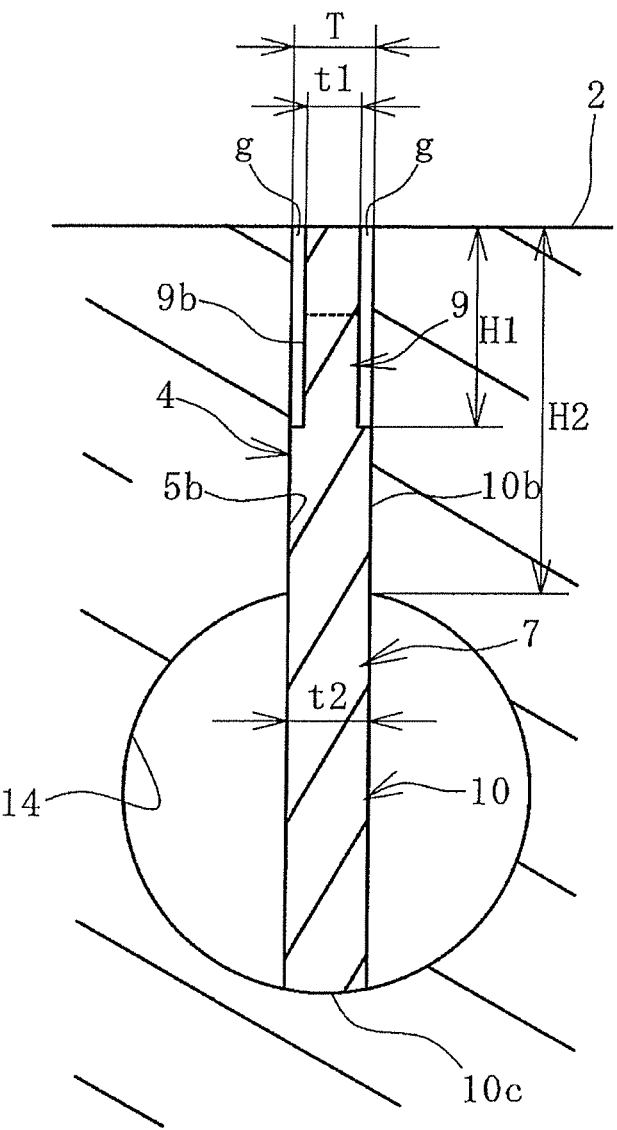
FIG. 4 is an enlarged partial view of FIG. 3.

A contact section 10 is provided below the upper end section 9 of the blade 7. A thickness t2 of the contact section 10 is larger than the thickness t1 of the upper end section 9. As shown in FIG. 4, a vertically cross section of the blade 7 has a step-like shape where the upper end section 9 becomes thinner than the contact section 10.

In consideration of the ease of press fitting into the ventilation groove 4 and the holding strength after press fitting, the thickness t2 of the contact section 10 is set to be, for example, approximately 0 to 0.1 mm larger than the thickness T of the ventilation groove 4 and is preferably set to be larger than the thickness T. More specifically, it is good to set the thickness t2 of the contact section 10 to be approximately 0.01 mm larger than the thickness T of the ventilation groove 4.

A height H1 of the upper end section 9 is, for example, approximately 0.5 to 5.0 mm and preferably approximately 1.0 to 2.0 mm. By setting the height H1 of the upper end section 9 to 0.5 to 5.0 mm, the strength of the blade 7 can be ensured while easily securing a small gap g to an appropriate depth between the blade and the ventilation groove 4.

A height H2 from the tire molding surface 2 to the ventilation hole 14 is larger than the height H1 and, in consideration of ventilation efficiency and the like, is set to be, for example, approximately 2.0 to 10.0 mm and preferably approximately 3.0 to 5.0 mm. A diameter of the ventilation hole 14 is, for example approximately 2 to 10 mm.

As shown in FIG. 4, when the blade 7 is press fitted and embedded in the ventilation groove 4, a lower end face 10c of the blade 7 contacts an internal surface of the ventilation hole 14 such that a depth position of the blade is fixed. Both lengthwise end faces 9a of the upper end section 9 of the blade 7 contact both lengthwise end faces 5a of the ventilation groove 4, and small gaps g are formed between a thickness-wise side face 9b of the upper end section 9 of the blade 7 and a thickness-wise side face 5b of the ventilation groove 4 on both thickness-wise sides of the same. Meanwhile, both lengthwise end faces 10a of the contact section 10 contact both lengthwise end faces 5a of the ventilation groove 4, and both thickness-wise side faces 10b of the contact section 10 contact both thickness-wise side faces 5b of the ventilation groove 4.

The blade 7 has a communication section that allows communication between the small gaps g and the ventilation hole 14. In this embodiment, the communication section 11 is formed by cutting out a lengthwise middle portion of the blade 7. It is also possible to provide a plurality of communication sections 11. The small gaps g are set to such a size that air a and gasses can pass through but rubber (unvulcanized rubber of a green tire) cannot, e.g., approximately 0.02 to 0.05 mm.

With the disclosed embodiments, since the ventilation groove 4 has a rectangular shape in a plan view, complex machining is not necessary to form the ventilation groove 4 and the machining is simplified. Therefore, the groove 4 can be formed using such a machining process as cutting or electric discharge machining and can be formed easily in a short amount of time and without variation with respect to the design dimensions. Since the blade 7 can also be formed precisely to the design dimensions by a machining or other process, the small gaps g can be formed to a specified size without variation. Therefore, the same small gap g can be formed on both thickness-wise sides of the blade 7 without the gap on one side being larger than the other.

When the blade 7 is press fitted and embedded in the ventilation groove 4, the blade 7 is held by the contact section 10 and stable small gaps g can be secured between the blade 7 and the ventilation groove 4 across the entire length of the upper end section 9. That is, since the ventilation groove 4 formed in the tire molding surface 2 can be used effectively and the surface areas of the small gaps g can be made large, the ventilation efficiency can be improved even further.

Figure 5:
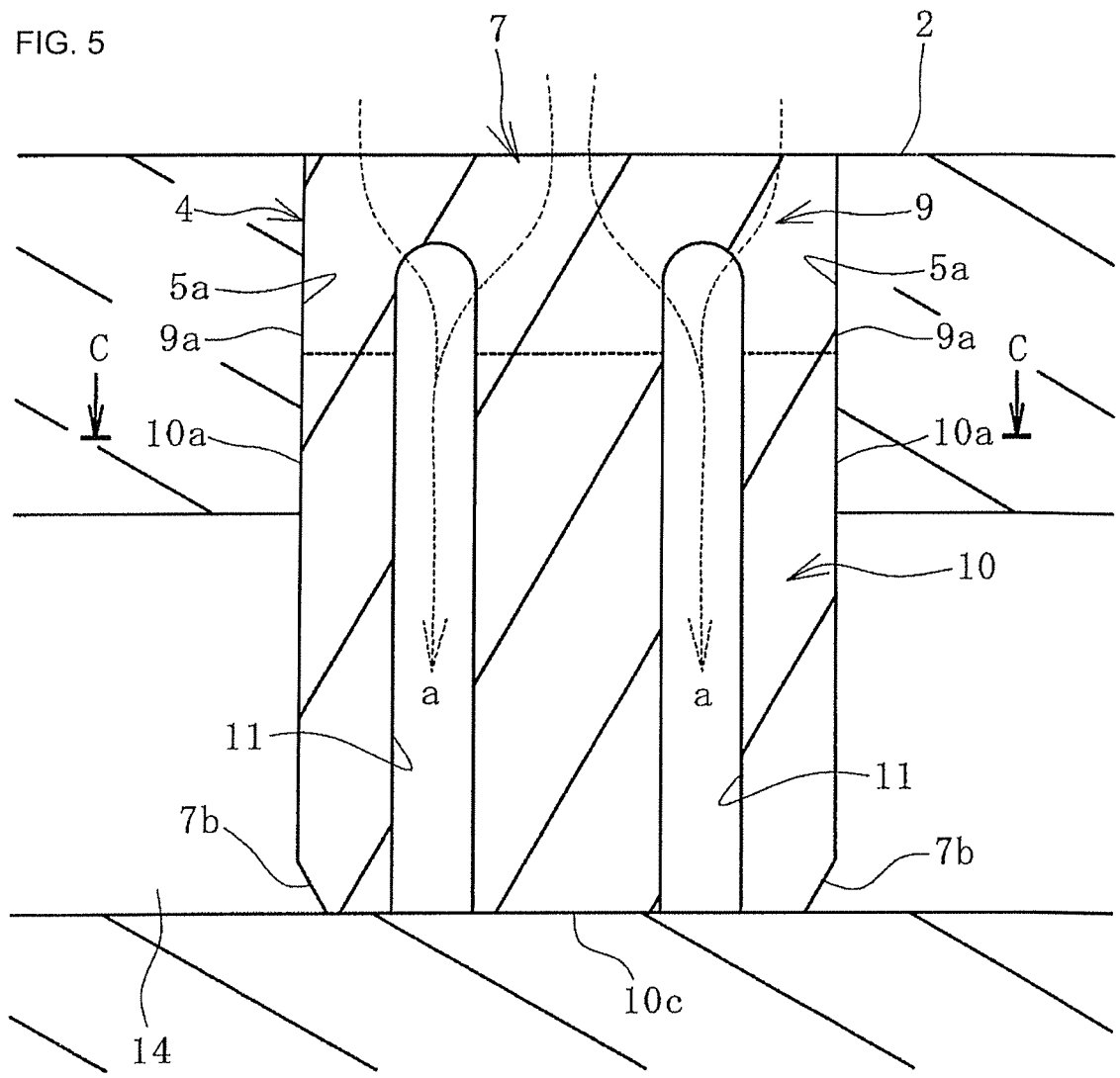
FIG. 5 is a cross sectional view taken along section line B-B of FIG. 2.
Figure 6:
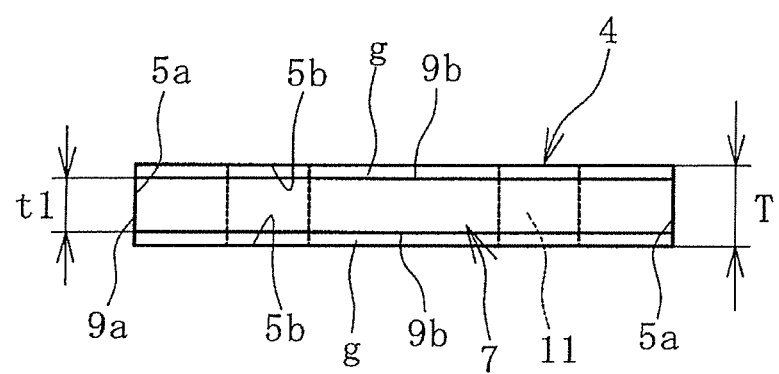
FIG. 6 is an enlarged partial view of FIG. 2.
Figure 7:
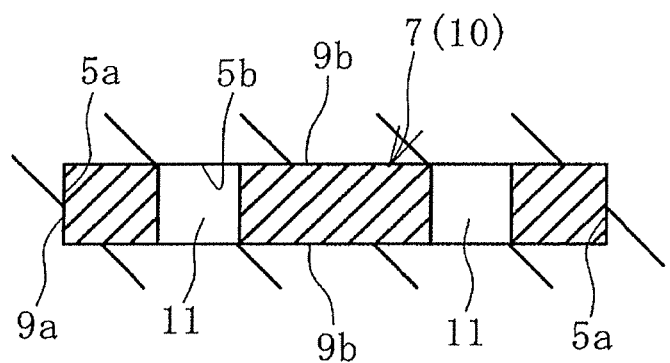
FIG. 7 is a cross sectional view taken along section line C-C of FIG. 5.

Therefore, unnecessary air a and generated gas occurring when a green tire is vulcanized can pass from the tire molding surface 2 through the small gaps g and the communication section 11 as shown in FIG. 5 and be vented to the exterior of the mold 1 through the ventilation hole 14. In this way, stable ventilation can be ensured when a tire is vulcanized and such vulcanization failures as insufficient filling of rubber with respect to a tire being vulcanized can be prevented.

In this embodiment, a chamfered section 7b is formed on both lengthwise ends of the lower end face 10c of the blade 7 as shown in FIG. 5. As a result, the blade 7 can be inserted smoothly and easily when it is press fitted into the ventilation groove 4 as shown in FIG. 8. Also, if the blade 7 contacts an upper edge of the opening of the ventilation groove 4 when the blade is press fitted, then the contact will be made with the chamfered section 7b and the mold material will be less likely to be cut than if contact were made with a sharp angle. Thus, it is possible to prevent such trouble as gas collecting in the ventilation groove 4 due to a cut of the mold material and causing variation of the embedded condition of the blade 7.

Figure 9:
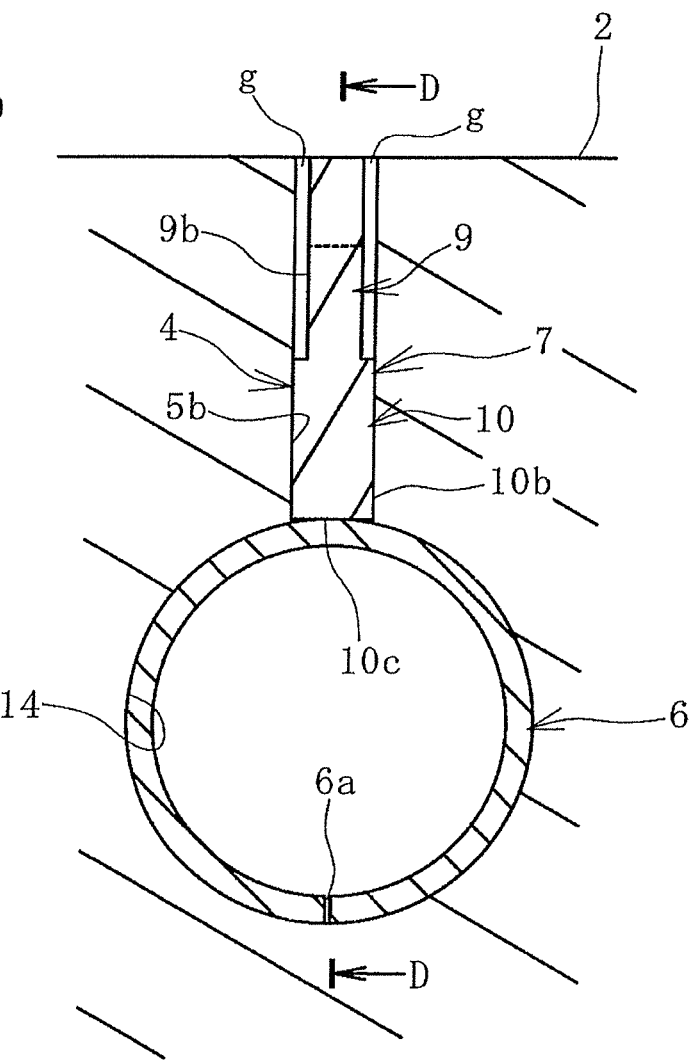
FIG. 9 is a cross sectional view (equivalent to FIG. 4) showing an example of another embodiment.
Figure 10:
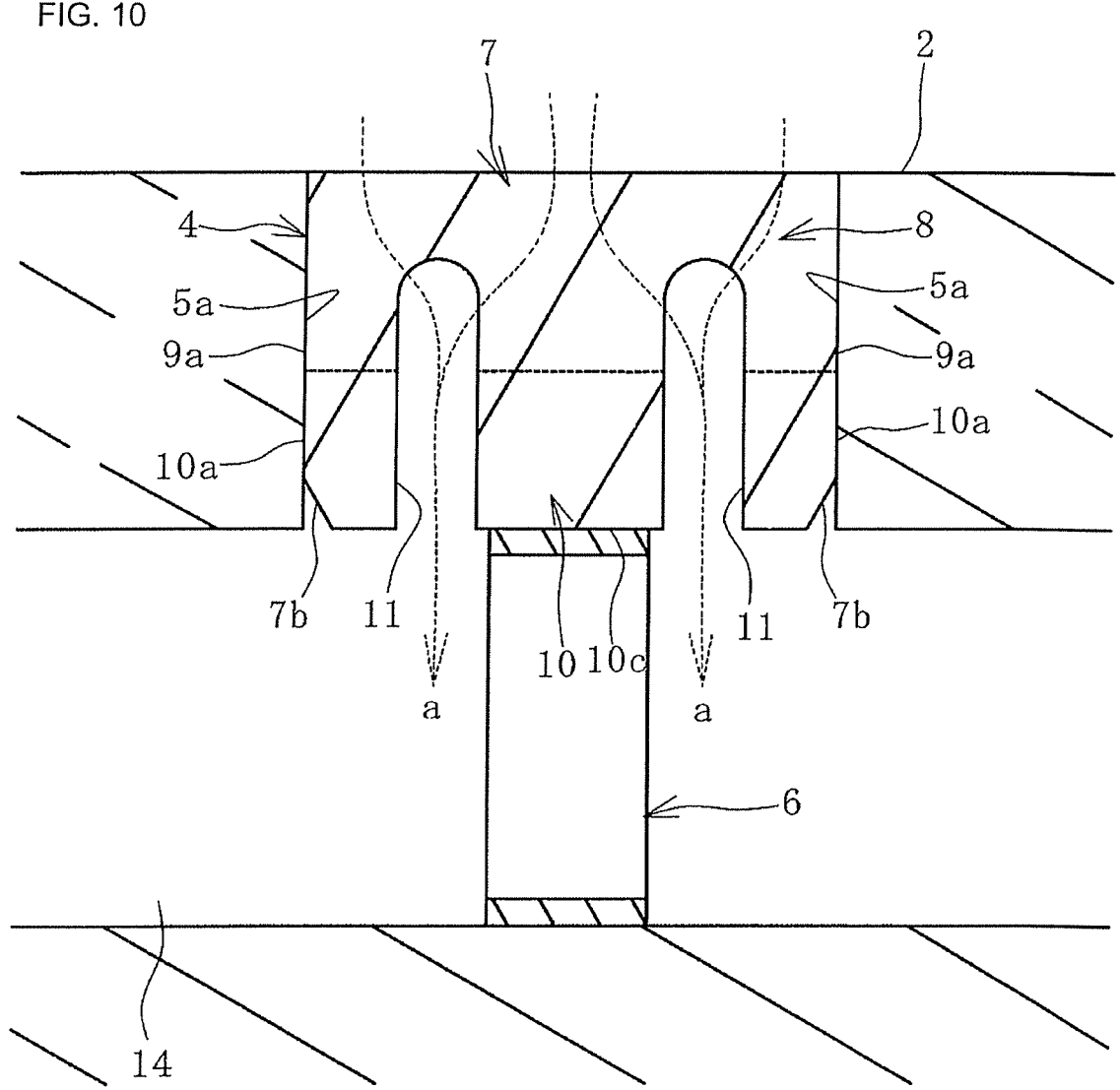
FIG. 10 is a cross sectional view taken along section line D-D of FIG. 9.

Another embodiment will now be explained with reference to FIG. 9 and FIG. 10. Different from the previously explained embodiment, in this embodiment a slotted pin 6 made of metal is fitted into the ventilation hole 14. When the blade 7 is embedded into the ventilation groove 4, the lower end face 10c of the blade 7 contacts an outer circumferential surface of the slotted pin 6. The position of the blade 7 in a depth direction is fixed by the blade 7 contacting the slotted pin 6.

With this configuration, the height dimension of the blades 7 can be decreased such that the blades 7 are more compact and the material cost is reduced. Reducing the height dimension is also advantageous in that it makes the blade 7 less likely to become bent due to an unintentional external bending force acting on the blade when it is press fitted into the ventilation groove 4.

The invention is not limited to using a slotted pin 6 and it is acceptable to press fit any other cylindrical body into the ventilation hole 14. However, using a slotted pin 6 enables an external diameter of the pin to be adjusted using the slot 6a. When the external diameter of the slotted pin 6 is adjusted (reduced), the slotted pin 6 will exert a spring force trying to regain its shape and the slotted pin 6 can easily be fitted securely into the ventilation hole 14.

A plurality of the slotted pins 6 can also be provided with respect to a single blade 7. The axial length of the slotted pin 6 is determined as appropriate and is set, for example, to at least 20% of the length dimension of the blade 7 and preferably at least 30%.

Figure 11:
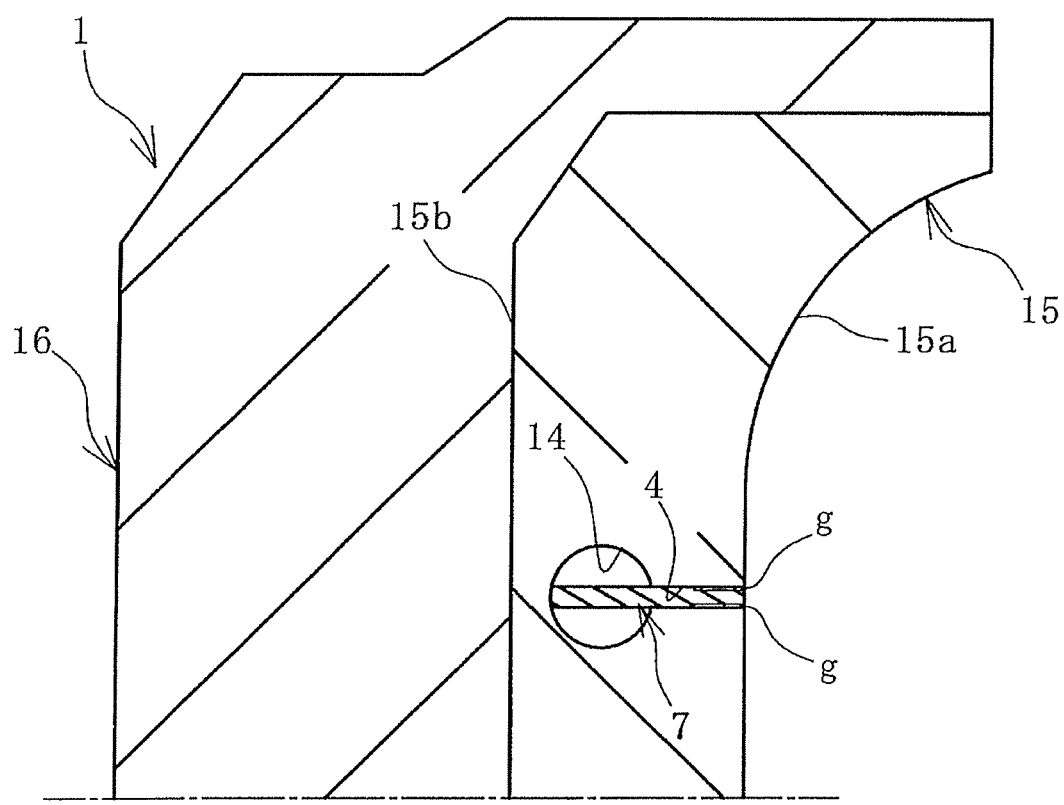
FIG. 11 is a cross sectional view showing an example of another type of tire vulcanization mold according to another disclosed embodiment.
Figure 12:
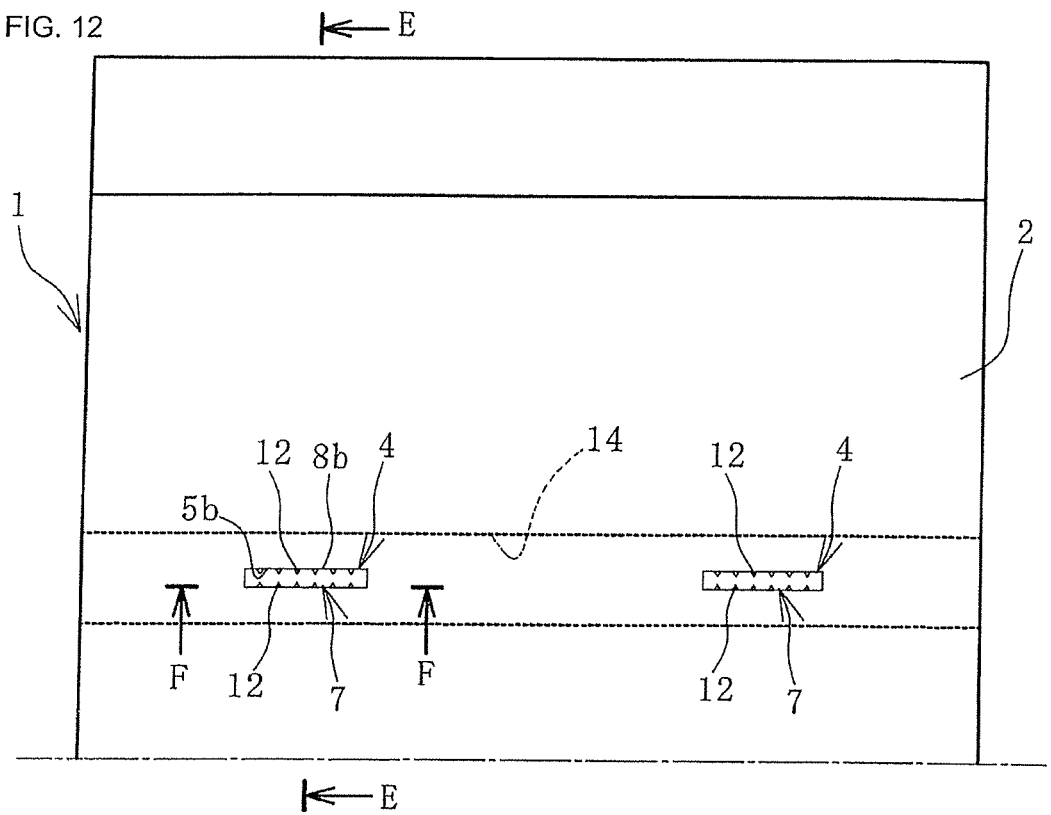
FIG. 12 is a plan view showing an example of a portion of a tire molding surface of tire vulcanization mold shown in FIG. 11.

The present invention is not limited to a one-piece mold 1 like that shown in FIG. 3, but can also be applied to a mold 1 like that shown in FIG. 11, which comprises a piece 15 having a tire molding surface 15a attached to a back block 16. With this type of mold 1, the ventilation hole 14 is provided toward a back surface 15b of the piece 15 and extends from one end face of the piece 15 to another such that it communicates with the ventilation grooves 4.

Although the blade 7 is securely held by being press fitted into the ventilation groove 4, it is acceptable to apply an adhesive between the ventilation hole 4 and the contact section 10 of the blade 7 to supplement the secure hold obtained with the press fit. Also, the orientation of the ventilation grooves 4 with respect to the ventilation hole 14 is arbitrary. For example, the ventilation grooves 4 can be arranged such that the thickness direction of the ventilation grooves 4 is aligned with the direction in which the ventilation hole 14 extends.

Also, although in the embodiment's an upper end face of the blade 7 does not protrude from the tire molding surface 2, it is also acceptable for the upper end face to protrude. That is, the blade 7 can be used as a sipe forming blade that forms a sipe in the tire.

Another tire vulcanization mold according to a disclosed embodiment will now be explained.

As shown in FIGS. 12 to 16, the molds 1 are made of aluminum or other material and have a tire molding surface 2 formed on an inner circumferential surface. A plurality of venting grooves 4 are formed in the tire molding surface 2 such that they open at the tire molding surface. A blade 7 is press fitted and embedded in each of the ventilation grooves 4. The tire molding surface 2 and an upper end surface of the blade 7 are at substantially the same level. A ventilation hole 14 is formed in each of the molds 1 such that it extends from one end face to another end face. The ventilation hole 14 connects to the ventilation grooves 4 and allows the ventilation grooves 4 to communicate with an exterior of the mold 1. The ventilation grooves 4 are arranged such that their lengthwise directions are aligned with a direction in which the ventilation hole 14 extends.

Each of the ventilation grooves 4 has a prescribed uniform thickness T and is rectangular in a plan view. Each of the ventilation grooves 4 is cut with the uniform thickness T to a depth H2 in a depth direction.

Each of the blades 7 is a thin plate made of stainless steel or other metal and has a shape approximately corresponding to the shape of the ventilation groove 4 in a side view. In consideration of the ease of press fitting into the ventilation groove 4 and the holding strength after press fitting, the thickness t of the contact section 7—which is, for example approximately 1 mm—is set to be, for example, approximately 0 to 0.1 mm larger than the thickness T of the ventilation groove 4 and is preferably larger than the thickness T. More specifically, it is good to set the thickness t to be approximately 0.01 mm larger than the thickness T of the ventilation groove 4.

Figure 14:
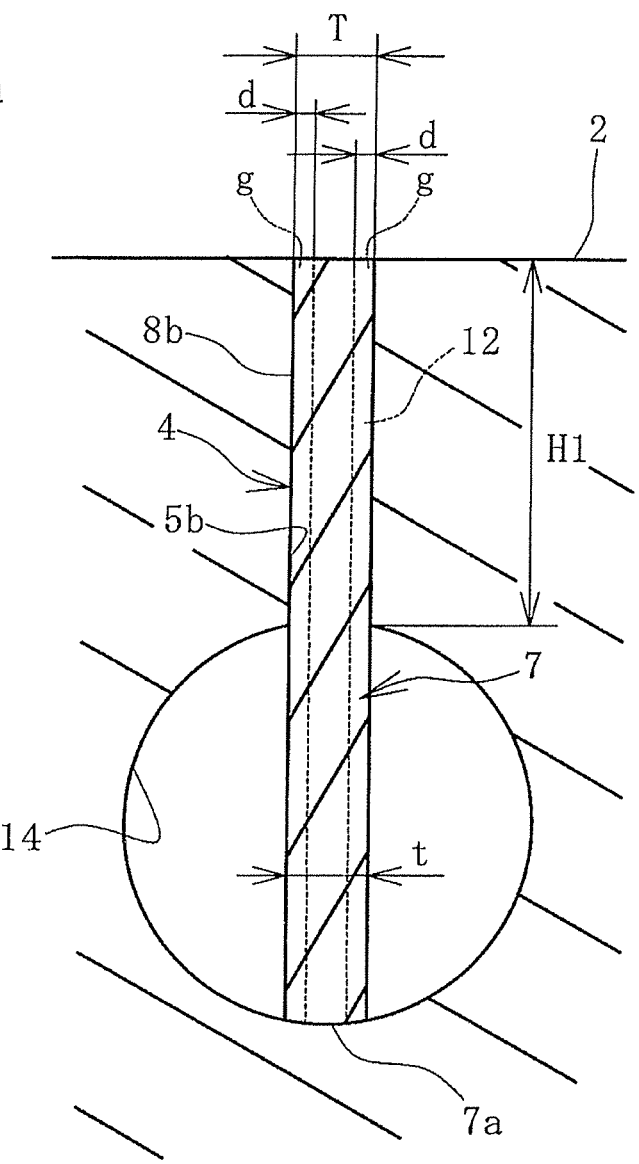
FIG. 14 is an enlarged partial view of FIG. 13.

The blade 7 has a groove section 12 formed in both side faces that face in a thickness direction of the blade, and the groove sections extend from an upper end to a lower end of the blade. As shown in FIG. 14, when the blade 7 is press fitted and embedded in the ventilation groove 4, a lower end face 7a of the blade 7 contacts an internal surface of the ventilation hole 14 such that a depth position of the blade is fixed. Both lengthwise end faces 8a of the blade 7 contact both lengthwise end faces 5a of the ventilation groove 4, and small gaps g are formed by the groove sections 12 between a thickness-wise side face 8b of the blade 7 and a thickness-wise side face 5b of the ventilation groove 4 on both thickness-wise sides of the same.

Consequently, a depth d of the groove sections 12 is set such that air a and gasses can pass through the small gaps g but rubber (unvulcanized rubber of a green tire) cannot. Therefore, the groove depth d is set to, for example, 0.01 to 0.50 mm and preferably 0.05 to 0.2 mm. In consideration of a venting efficiency, a distance between adjacent groove sections 12 (a pitch of the groove sections 12) is set to, for example, 0.3 to 3.0 mm and, preferably, 0.5 to 1.0 mm.

Instead of extending from the upper end to the lower end of the blade 7, it is acceptable for the groove sections 12 to extend in a diagonal direction or to be curved. A lateral cross sectional shape of the groove sections 12 is not limited to the V-shape shown in FIG. 16; various other shapes can also be used, such as a circular arc shape or a square shape.

It is also acceptable to provide the groove sections 12 in only one thickness-wise side face of the blade 7 or in at least one of the side faces. When groove sections 12 are formed on both side faces of the blade 7, the specifications of the groove sections 12 are basically the same on both sides but the pitches can be different.

The height H1 of the ventilation grooves 4 is, for example, 0.5 to 5.0 mm and preferably 1.0 to 2.0 mm By setting the height H1 to 0.5 to 5.0 mm, the strength of the blade 7 can be ensured while easily securing a small gap g to an appropriate depth between the blade and the ventilation groove 4. A diameter of the ventilation hole 14 is, for example approximately 2 to 10 mm.

Since the ventilation groove 4 has a rectangular shape in a plan view, complex machining is not necessary to form the ventilation groove 4 and the machining is simplified. Therefore, the groove 4 can be formed using such a machining process as cutting or electric discharge machining and can be formed easily in a short amount of time and with little variation with respect to the design dimensions. Since the blade 7 has a simple shape and can also be formed precisely to the design dimensions by a machining or other process, the small gaps g can be formed to a specified size without variation. When groove sections 12 are formed on both thickness-wise side faces of the blade 7, the same size small gap g can be formed on both sides.

Figure 15:
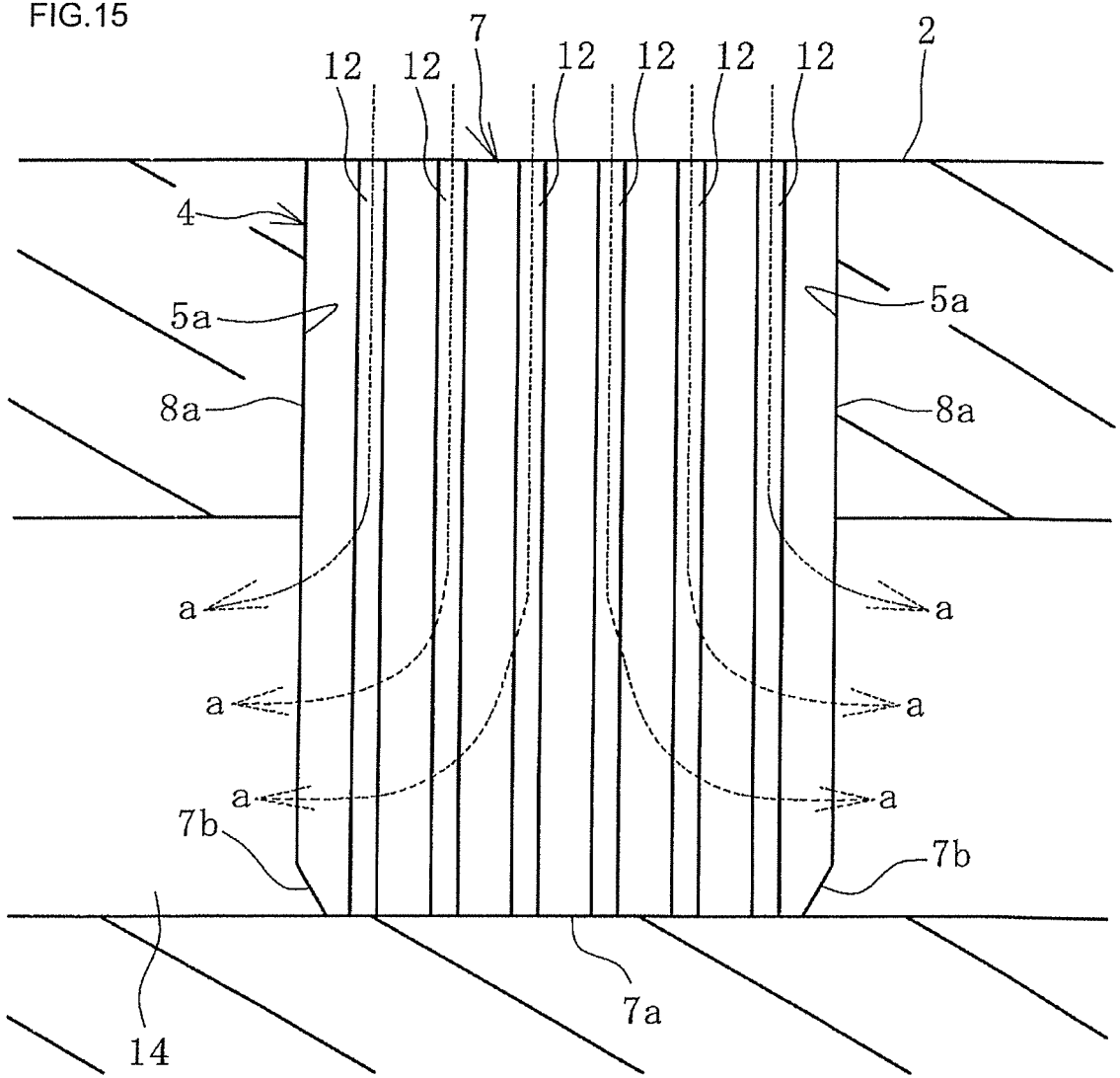
FIG. 15 is a cross sectional view taken along section line F-F of FIG. 12.

Therefore, unnecessary air a and generated gas occurring when a green tire is vulcanized can pass from the tire molding surface 2 through the small gaps g as shown in FIG. 15 and be vented to the exterior of the mold 1 through the ventilation hole 14. In this way, stable ventilation can be ensured when a tire is vulcanized and such vulcanization failures as insufficient filling of rubber with respect to a tire being vulcanized can be prevented.

Figure 17:
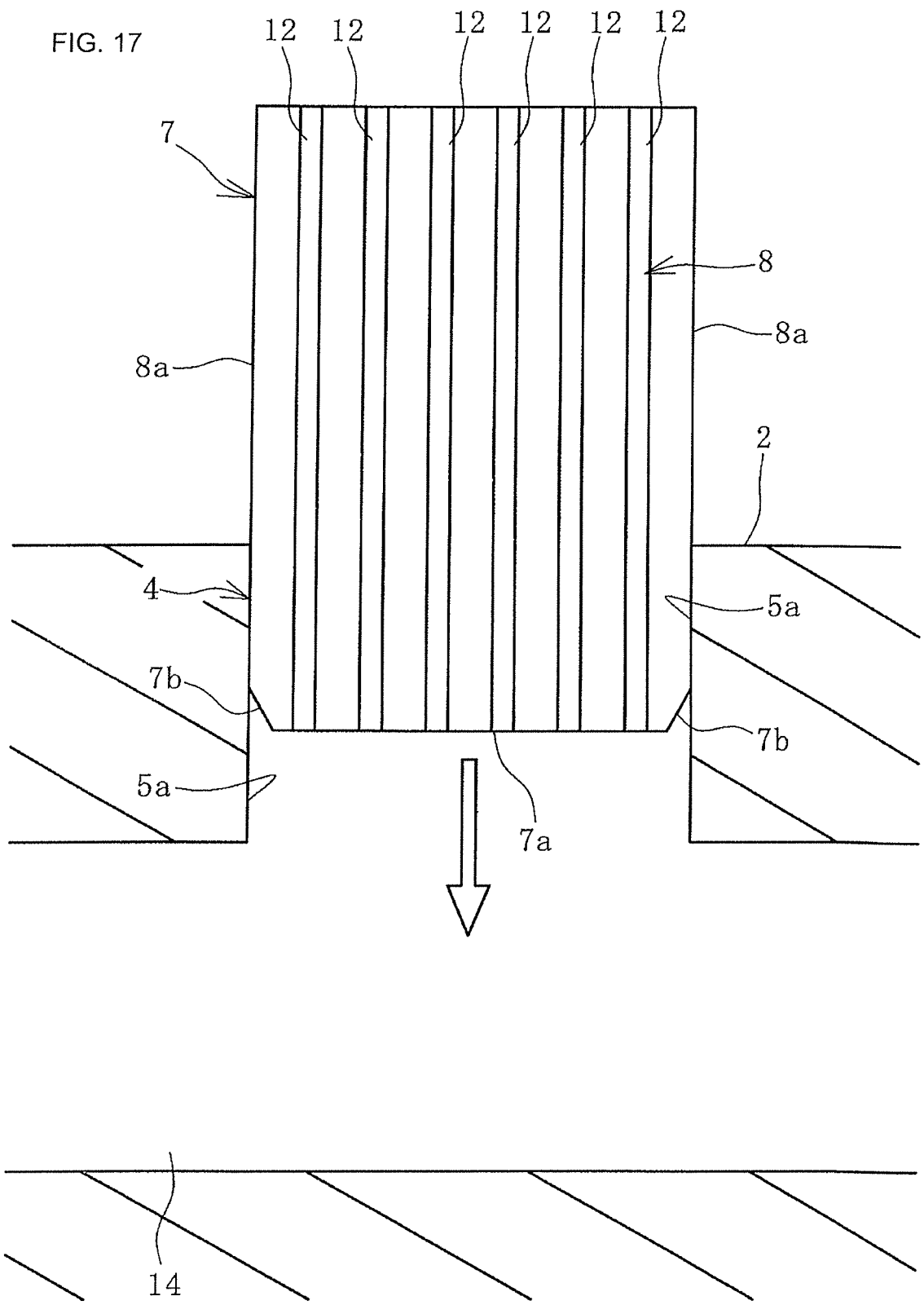
FIG. 17 is a cross sectional side-face view showing an example of a blade being press fitted into a ventilation groove.

In this embodiment, a chamfered section 7b is formed on both lengthwise ends of the lower end face 7a of the blade 7 as shown in FIG. 15. As a result, the blade 7 can be inserted smoothly and easily when it is press fitted into the ventilation groove 4 as shown in FIG. 17. Also, if the blade 7 contacts an upper edge of the opening of the ventilation groove 4 when the blade is inserted, then the contact will be made with the chamfered section 7b and the mold material will be less likely to be cut than if contact were made with a sharp angle. Thus, it is possible to prevent such trouble as gas collecting in the ventilation groove 4 due to a cut of the mold material and causing variation of the embedded condition of the blade 7.

Figure 18:
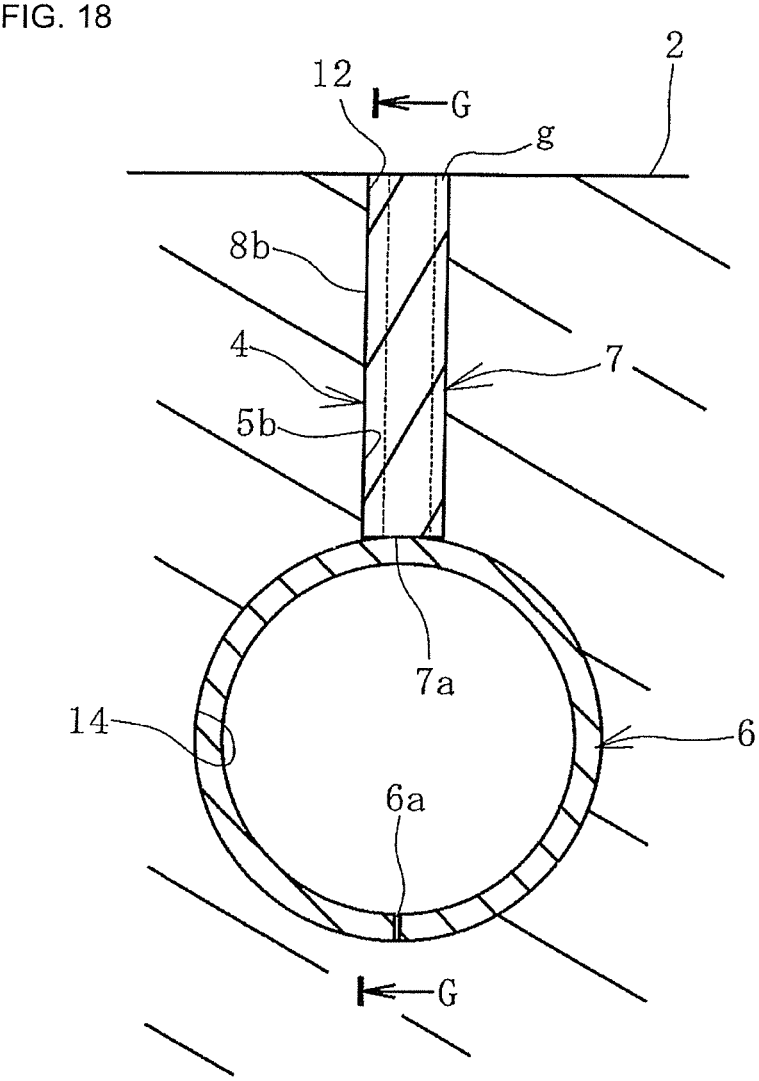
FIG. 18 is a cross sectional view (equivalent to FIG. 14) showing an example of another embodiment.
Figure 19:
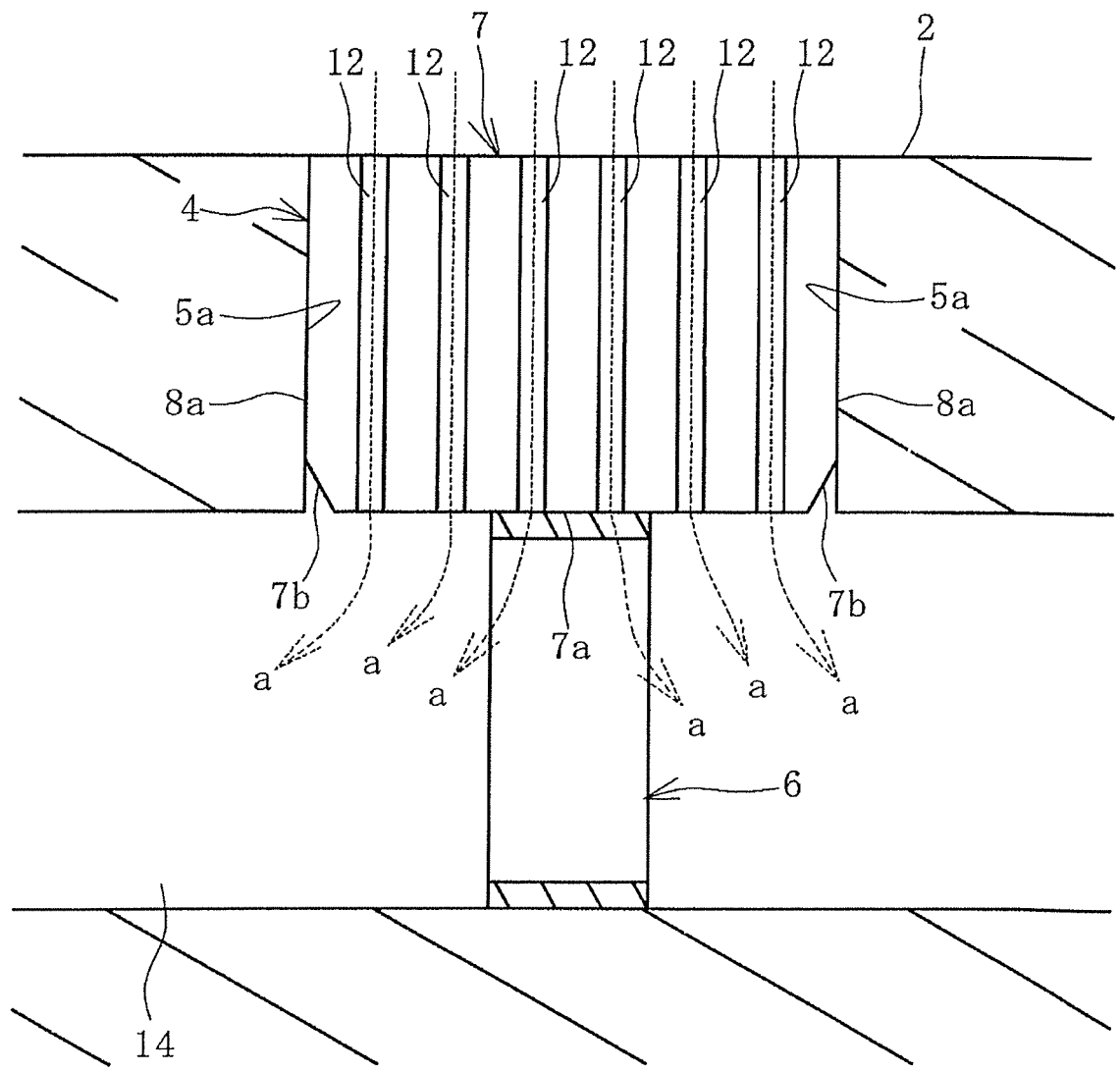
FIG. 19 is a cross sectional view taken along section line G-G of FIG. 18.

Another embodiment will now be explained with reference to FIG. 18 and FIG. 19. Differently from the previously explained embodiment, in this embodiment a slotted pin 6 made of metal is fitted into the ventilation hole 14. When the blade 7 is embedded into the ventilation groove 4, the lower end face 7a of the blade 7 contacts an outer circumferential surface of the slotted pin 6. The position of the blade 7 in a depth direction is fixed by the blade 7 contacting the slotted pin 6.

With this configuration, the height dimension of the blades 7 can be decreased such that the blades 7 are more compact and the material cost is reduced. Reducing the height dimension is also advantageous in that it makes the blade 7 less likely to become bent due to an unintentional external bending force acting on the blade when it is inserted into the ventilation groove 4.

The invention is not limited to using a slotted pin 6 and it is acceptable to insert any other cylindrical body into the ventilation hole 14. However, using a slotted pin 6 enables an external diameter of the pin to be adjusted using a slot 6a. When the external diameter of the slotted pin 6 is adjusted (reduced), the slotted pin 6 will exert a spring force trying to regain its shape and the slotted pin 6 can easily be fitted securely into the ventilation hole 14.

A plurality of the slotted pins 6 can also be provided with respect to a single blade 7. The axial length of the slotted pin 6 is determined as appropriate, but it is set, for example, to at least 20% of the length dimension of the blade 7, and preferably at least 30%.

Figure 20:
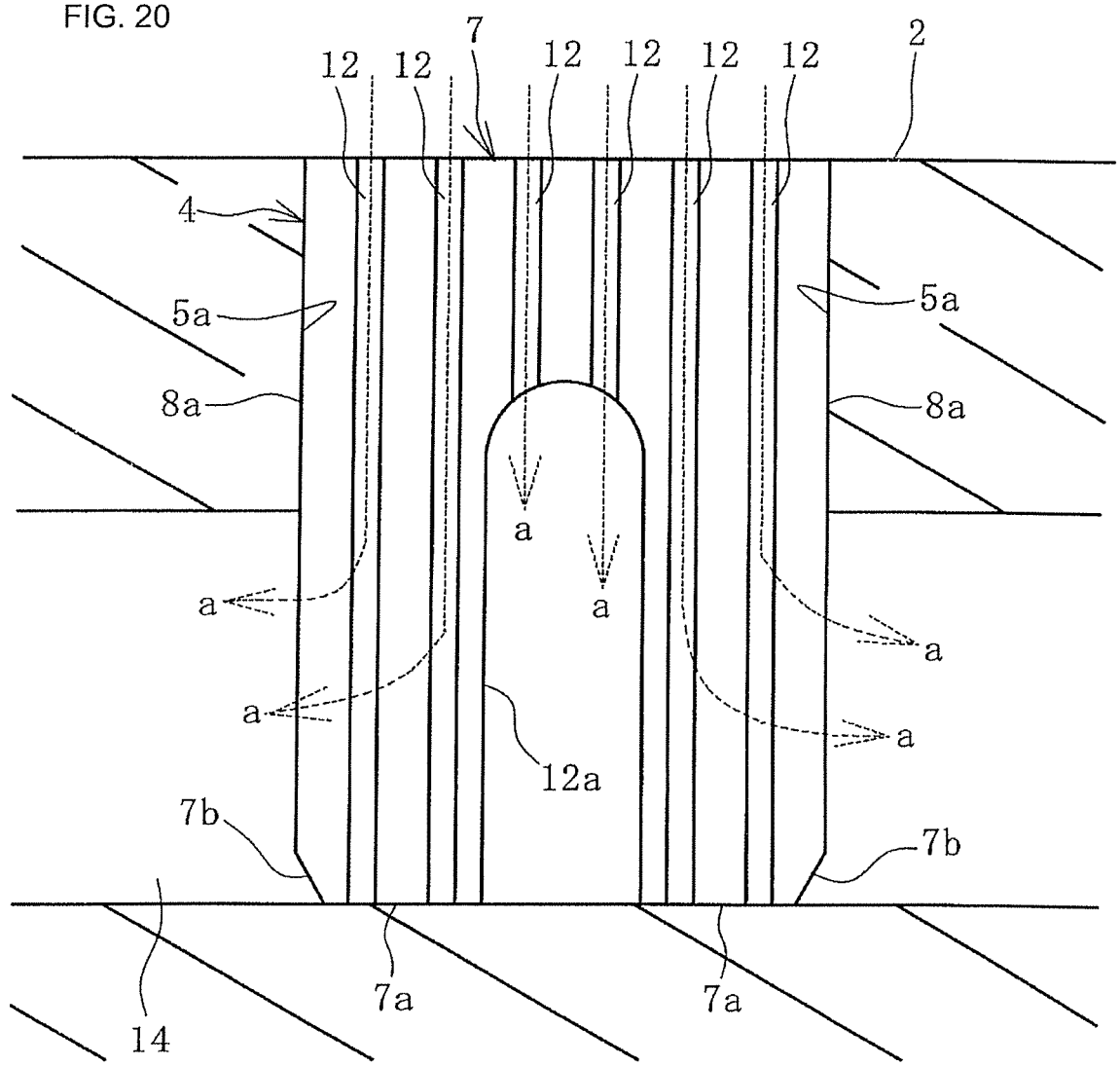
FIG. 20 is a cross sectional view (equivalent to FIG. 15) showing a variation of the blade.

As shown in FIG. 20, the blade 7 can also have a communication section 12a that is wider than a groove section 12. The communication section 12a is formed by cutting out a lengthwise middle portion of the blade 7 and extends from the lower end face 7a to an intermediate position in a height direction.

When the blade 7 is press fitted and embedded in the ventilation groove 4, the communication section 12a protrudes farther upward than the ventilation hole 14. Consequently, the groove sections 12 communicating with the communication section 12a serve to vent air a and gasses through the communication section 12a to the ventilation hole 14. Since the communication section 12a is wider than the groove sections 12, the ventilation efficiency can be improved even further.

Figure 21:
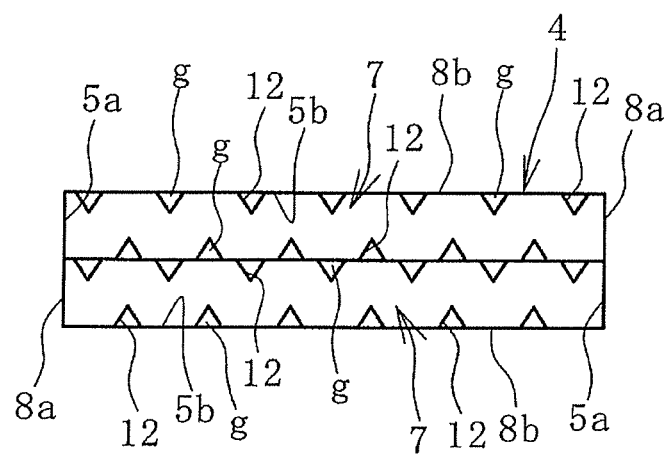
FIG. 21 is a plan view (equivalent to FIG. 16) showing an embodiment in which a plurality of blades are layered together.

As shown in FIG. 21, it is also possible to embed two blades 7 layered together along a thickness direction into one ventilation groove 4. In this embodiment, a small gap g is formed between the ventilation groove 4 and each of the groove sections 12 provided in the blade 7, and small gaps g are also formed between the adjacent blades 7 by the groove sections 12.

When a plurality of blades 7 are layered together and embedded in the ventilation groove 4, a total surface area of the small gaps g can be varied according to the combination of blades 7 and a desired ventilation efficiency can be obtained more easily. The number of blades 7 layered together is not limited to two; any number can be used.

Figure 16:
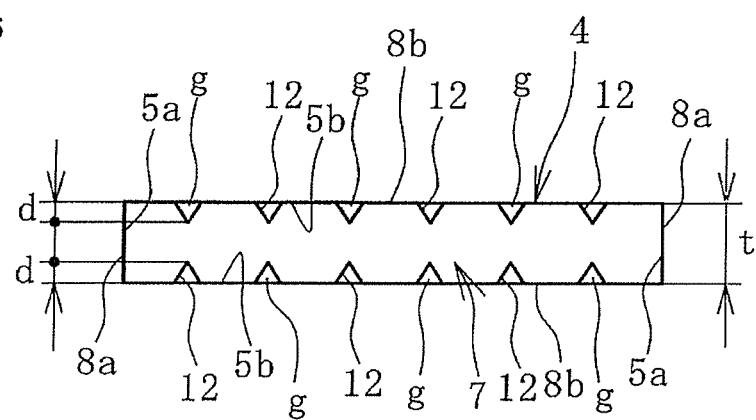
FIG. 16 is an enlarged partial view of FIG. 12.

When groove sections 12 are formed on both thicknesswise side faces of the blade 7, it is preferable to offset the positions of the groove sections 12 formed on the respective sides along a lengthwise direction of the blade 7 as shown in FIG. 21. It is good to offset the groove sections 12 both when a single blade 7 is embedded in the ventilation groove 4 as shown in FIG. 16 and when a plurality of blades 7 are layered together and embedded in the ventilation groove 4.

When the groove sections 12 are arranged offset from one another in this way, the blade 7 can be configured to have a larger minimum thickness. Thus, the blade 7 can be made such that it is more difficult to deform.

Figure 22:
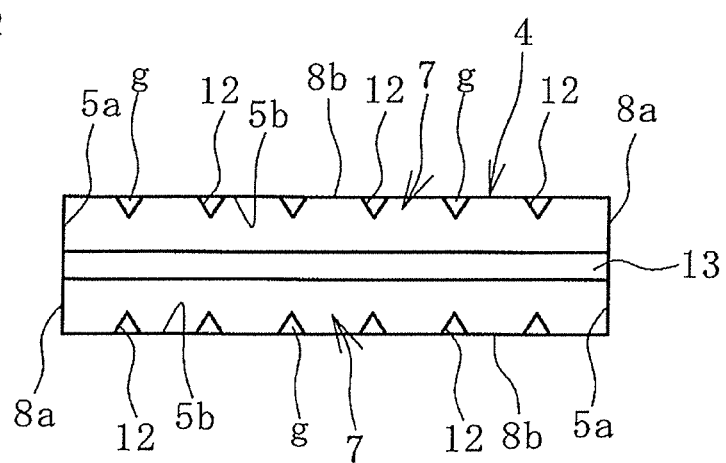
FIG. 22 is a plan view (equivalent to FIG. 16) showing an embodiment in which a shim is disposed between layered blades.

As shown in FIG. 22, it is also possible to provide a shim 13 that is layered onto the blade 7 in a thickness direction of the blade 7 and embedded into the ventilation groove. The shim 13 is a simple metal plate having a uniform thickness. With a shim 13 as in this embodiment, a blade 7 having a prescribed thickness prepared in advance can be press fitted and embedded into ventilation grooves 4 having various thicknesses by changing the thickness of the shim 13.

Figure 13:
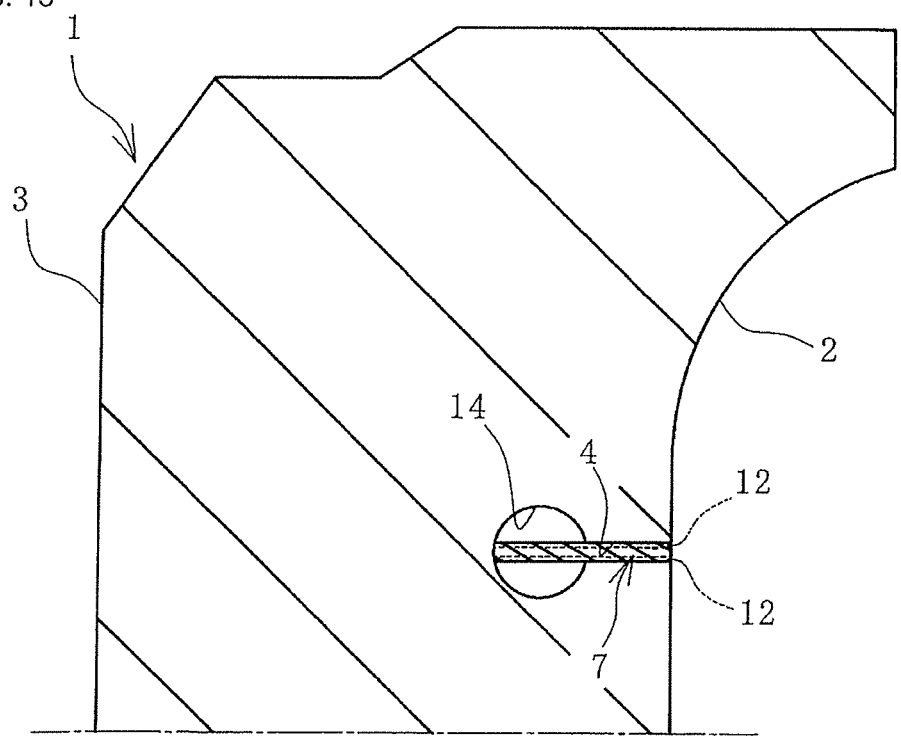
FIG. 13 is a cross sectional view taken along section line E-E of FIG. 12.
Figure 23:
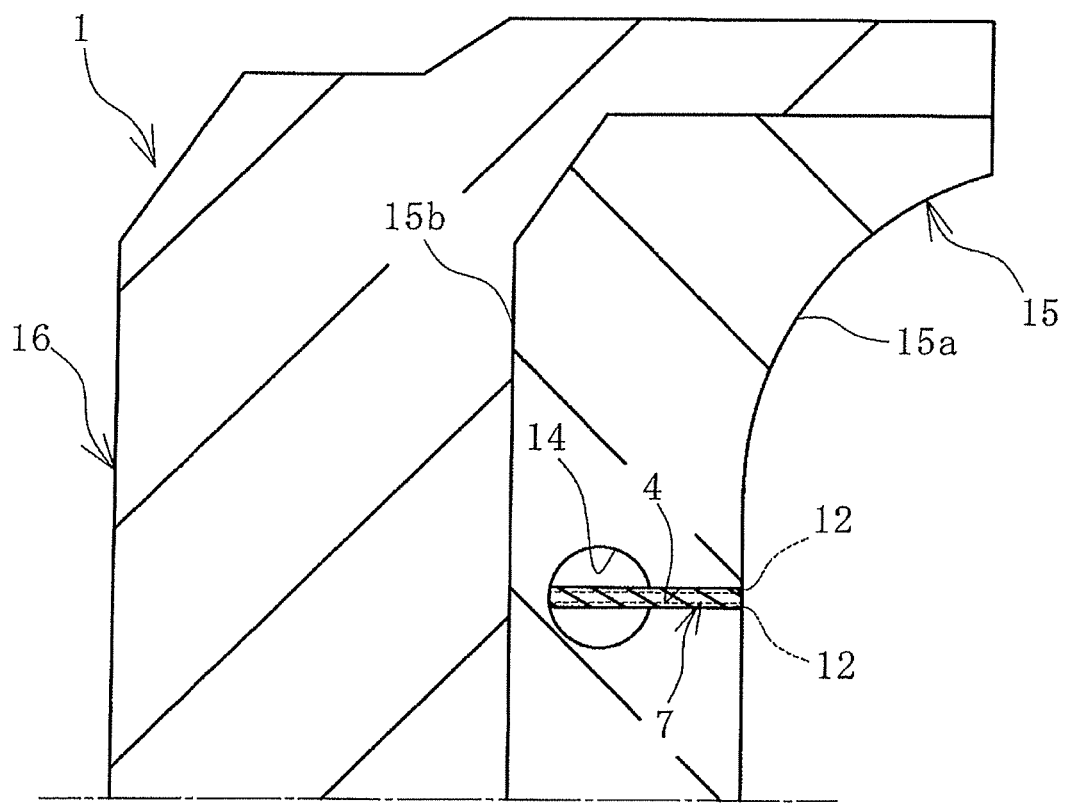
FIG. 23 is a cross sectional view showing an example of another type of mold according to a disclosed embodiment.

The present invention is not limited to a one-piece mold 1 like that shown in FIG. 13. It can also be applied to a mold 1 like that shown in FIG. 23, which comprises a piece 15 having a tire molding surface 15*a* attached to a back block 16. With this type of mold 1, the ventilation hole 14 is provided toward a back surface 15*b* of the piece 15 and extends from one end face of the piece 15 to another such that it communicates with the ventilation grooves 4.

Also, the orientation of the ventilation grooves 4 with respect to the ventilation hole 14 is arbitrary. For example, the ventilation grooves 4 can be arranged such that the thickness direction of the ventilation grooves 4 is aligned with the direction in which the ventilation hole 14 extends.

Also, although in the embodiments an upper end face of the blade 7 does not protrude from the tire molding surface 2, it is also acceptable for the upper end face to protrude. That is, the blade 7 can be used as a sipe forming blade that forms a sipe in the tire.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A tire vulcanization mold comprising:
a body defining a ventilation groove in a tire molding surface and a ventilation hole that communicates between the ventilation groove and an exterior of the tire vulcanization mold, the ventilation groove being open at the tire molding surface and having a rectangular shape in a plan view of the tire molding surface; and
a blade configured to press fit and embed in the ventilation groove, the blade having an upper end section having a thickness smaller than a thickness of the ventilation groove to form a gap between a surface of the upper end section of the blade and a surface of the body defining the ventilation groove, a contact section that is below the upper end section and configured to contact both thickness-direction-facing side faces of the ventilation groove when the blade is embedded in the ventilation groove, and a communication section that communicates between the ventilation hole and the gap.

2. The tire vulcanization mold according to claim 1, further comprising
a cylindrical member configured to fit inside the ventilation hole; and
wherein while the blade is embedded in the ventilation groove, a lower end face of the blade contacts the cylindrical member such that a position of the blade in a depth direction is fixed by the cylindrical member.

3. The tire vulcanization mold according to claim 1, wherein
a height of the upper end section of the blade is within a range of 0.5 mm to 5.0 mm.

4. The tire vulcanization mold according to claim 1, wherein
the blade includes a chamfered section on both lengthwise ends of a lower end face of the blade.

5. The tire vulcanization mold according to claim 1, wherein
the upper end section forms a second gap between another surface of the upper end section of the blade and a second surface of the body defining the ventilation groove.

6. The tire vulcanization mold according to claim 5, wherein
the gap and the second gap are formed on opposite sides of the upper end section of the blade.

7. The tire vulcanization mold according to claim 1, wherein
the communication section includes a plurality of openings that extend in a lengthwise direction of the blade.

8. The tire vulcanization mold according to claim 7, further comprising
a cylindrical member configured to fit inside the ventilation hole; and
wherein while the blade is embedded in the ventilation groove, a portion of a lower end face of the blade that is between the plurality of openings contacts the cylindrical member such that a position of the blade in a depth direction is fixed by the cylindrical member and the openings communicate with the ventilation hole on opposite sides of the cylindrical member.

9. The tire vulcanization mold according to claim 1, wherein
while the blade is embedded in the ventilation groove, a lower end face of the blade contacts an internal surface of the body that defines the ventilation hole such that a position of the blade in a depth direction is fixed by the internal surface of the body.

10. The tire vulcanization mold according to claim 1, wherein
the body includes a back block and a tire molding surface piece that is coupled to the back block and defines the ventilation groove and the ventilation hole.

11. A tire vulcanization mold comprising:
a body defining a ventilation groove in a tire molding surface and a ventilation hole that communicates between the ventilation groove and an exterior of the tire vulcanization mold, the ventilation groove being open at the tire molding surface and having a rectangular shape in a plan view of the tire molding surface; and
at least one blade configured to press fit and embed in the ventilation groove, the blade having a groove section that is formed in at least one of a plurality of side faces of the blade that faces in a thickness direction of the blade, the groove section extends from an upper end to a lower end of the blade to form a gap between a surface of the at least one side face of the blade and a surface of the body defining the ventilation groove, the blade further including a communication section that communicates between the ventilation hole and the groove section.

12. The tire vulcanization mold according to claim 11, wherein
the groove sections are formed on both of the side faces of the blade.

13. The tire vulcanization mold according to claim 11, wherein
each of the groove sections includes a plurality of grooves, and positions of the grooves formed on a first of the side faces of the blade are offset along a lengthwise direction of the blade with respect to positions of the grooves formed on a second of the side faces of the blade.

14. The tire vulcanization mold according to claim 11, wherein
the blade includes a chamfered section on both lengthwise ends of a lower end face of the blade.

15. The tire vulcanization mold according to claim 11, wherein
while the blade is embedded in the ventilation groove, a lower end face of the blade contacts an internal surface of the body that defines the ventilation hole such that a position of the blade in a depth direction is fixed by the internal surface of the body.

16. The tire vulcanization mold according to claim 11, wherein
the body includes a back block and a tire molding surface piece that is coupled to the back block and defines the groove section and the ventilation hole.

17. A tire vulcanization mold comprising:
a body defining a ventilation groove in a tire molding surface and a ventilation hole that communicates between the ventilation groove and an exterior of the tire vulcanization mold, the ventilation groove being open at the tire molding surface and having a rectangular shape in a plan view of the tire molding surface;
at least one blade configured to press fit and embed in the ventilation groove, the blade having a groove section that is formed in at least one of a plurality of side faces of the blade that faces in a thickness direction of the blade, the groove section extends from an upper end to a lower end of the blade to form a gap between a surface of the at least one side face of the blade and a surface of the body defining the ventilation groove; and
a cylindrical member configured to fit inside the ventilation hole; and
while the blade is embedded in the ventilation groove, a lower end face of the blade contacts the cylindrical member such that a position of the blade in a depth direction is fixed by the cylindrical member.

18. A tire vulcanization mold comprising:
a body defining a ventilation groove in a tire molding surface and a ventilation hole that communicates between the ventilation groove and an exterior of the tire vulcanization mold, the ventilation groove being open at the tire molding surface and having a rectangular shape in a plan view of the tire molding surface;
at least one blade configured to press fit and embed in the ventilation groove, the blade having a groove section that is formed in at least one of a plurality of side faces of the blade that faces in a thickness direction of the blade, the groove section extends from an upper end to a lower end of the blade to form a gap between a surface of the at least one side face of the blade and a surface of the body defining the ventilation groove; and
a plurality of the blades that are layered together in a thickness direction to form a layered blade that is configured to press fit and embed into the ventilation groove.

19. A tire vulcanization mold comprising:
a body defining a ventilation groove in a tire molding surface and a ventilation hole that communicates between the ventilation groove and an exterior of the tire vulcanization mold, the ventilation groove being open at the tire molding surface and having a rectangular shape in a plan view of the tire molding surface;
at least one blade configured to press fit and embed in the ventilation groove, the blade having a groove section that is formed in at least one of a plurality of side faces of the blade that faces in a thickness direction of the blade, the groove section extends from an upper end to a lower end of the blade to form a gap between a surface of the at least one side face of the blade and a surface of the body defining the ventilation groove; and
a shim that is layered onto the blade in a thickness direction and configured to press fit and embed into the ventilation groove.

* * * * *